Patented Sept. 5, 1950

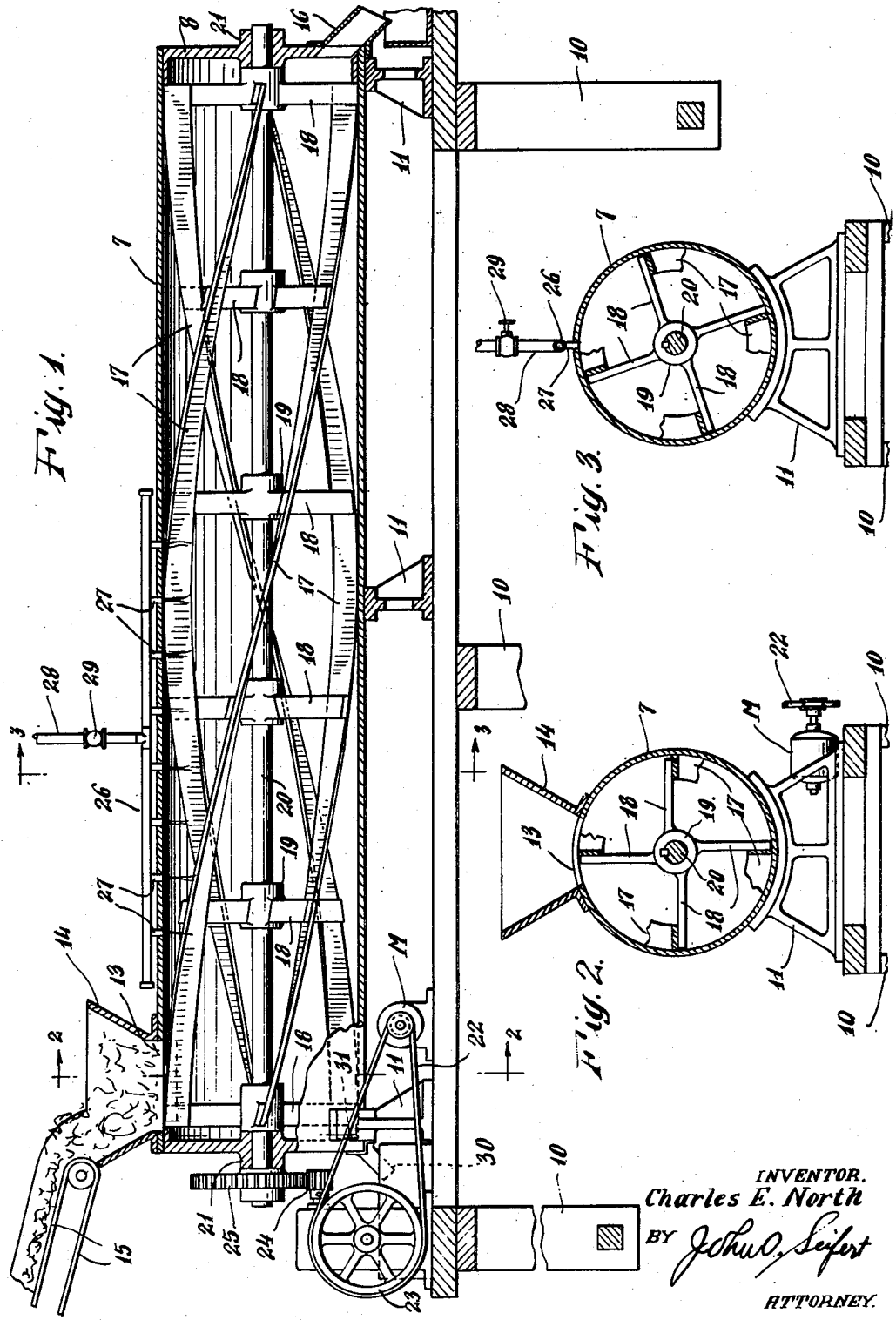

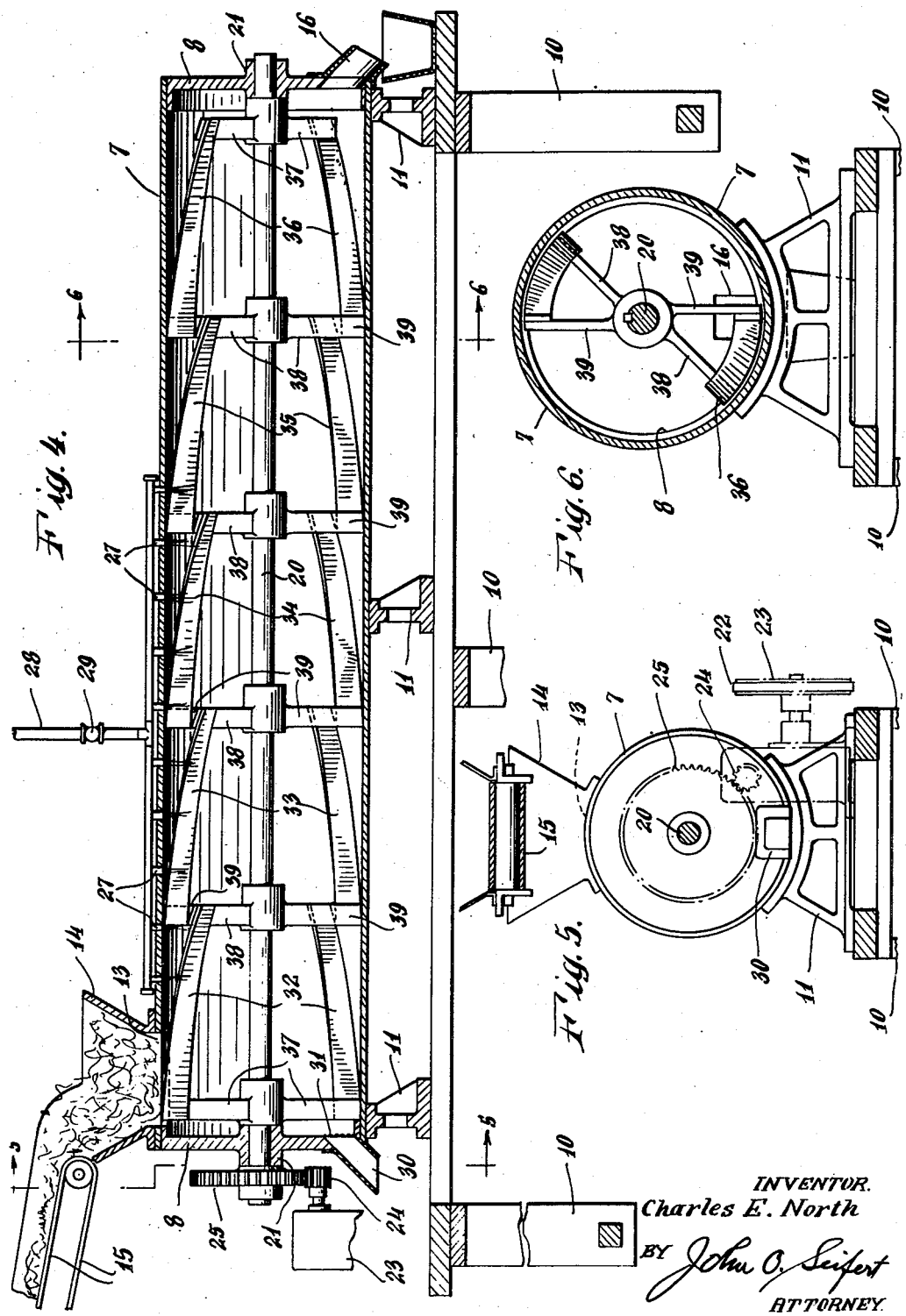

2,521,398

UNITED STATES PATENT OFFICE 2,521,398

CONTINUOUS BUTTER WORKING APPARATUS

Charles E. North, Montclair, N. J.

Application October 29, 1947, Serial No. 782,811

3 Claims. (Cl. 31—35)

This invention relates to apparatus for continuously working butter including a casing into which butter or butterfat is continuously fed and having means therein to cause the butter to be successively subjected to a turning action and a compression force and simultaneously progressively advance the butter from the end into which the butterfat is fed to and continuously discharge the worked butter from the opposite end of the casing.

It is the object of the invention to provide improved continuous butter working apparatus including a fixed cylindrical casing and means to continuously feed butter or butterfat into the casing above the axis at one end thereof, and the provision of means extending longitudinally of the casing in the form of parts of helices extending around a portion of a convolution in the casing adjacent the inner surface thereof and revoluble about the axis of the casing, and said means operative by the revolving movement thereof to successively elevate or lift the butter fed in the casing from below the axis and cause it to fall from said means in a plane above the axis of the casing and effect successive turning and compression of the butter and progressively advance the butter in the casing from the inlet end to and discharge it through an outlet at the opposite end of the casing.

It is another object of the invention to provide in continuous butter working apparatus of this character means for entering water in a spray into the casing to wash milk solids not fat from and work water into the butter, and the provision of an outlet for draining from the casing surplus water with ingredients washed from the butter.

In the drawings accompanying and forming a part of this application Figure 1 is a longitudinal sectional view of apparatus showing an embodiment of the invention.

Figure 2 is a sectional view taken on the line 2—2 of Figure 1 looking in the direction of the arrows.

Figure 3 is a cross sectional view taken substantially on the line 3—3 of Figure 1.

Figure 4 is a longitudinal sectional view of apparatus showing a modified embodiment of the invention.

Figure 5 is an end elevation of the apparatus shown in and looking in the direction of the arrows from the line 5—5 of Figure 4; and Figure 6 is a cross sectional view taken on the line 6—6 of Figure 4.

In carrying out the invention there is provided a fixed cylindrical casing 7 having closures 8 secured to the opposite ends, the cylinder being mounted to extend in a substantially horizontal plane upon a suitable supporting structure, and shown as a pair of parallelly extending sills connected by cross pieces and supported by legs 10. The cylinder is supported upon the sills by members 11 fixed upon and extending transversely of the sills, the upper surface of which members is arranged in an arc conforming to the curvature of and with which surface the cylinder engages and is supported at the side wall. There are three of said members 11, one at the opposite ends and one intermediate the ends of the cylinder.

The casing has an inlet opening to one end above the axis thereof, and shown as arranged in the cylindrical wall of the casing above the axis thereof, as at 13, to which the bottom of a hopper 14 supported upon the casing opens. The butterfat in the form of granules to be worked is continuously fed or delivered into said hopper and from the hopper through the inlet 13 into the casing, as by a conveyer 15, adapted to receive thereon butterfat extracted from cream by and discharged from apparatus for extracting butterfat from cream, such as disclosed in my Patent No. 2,455,945, issued December 14, 1948, the butterfat granules as they are transported by the conveyer being washed by subjecting the same to the action of sprays of water and draining the water from the butterfat granules. The casing has an outlet for the worked butter from the opposite end below the axis thereof, as at 16, said outlet having a chute connected thereto through which the worked butter is delivered into a suitable receptacle.

Means are provided in the casing to work the butterfat delivered into the casing by successively turning and subjecting the butter to a compression force or kneading action, and said means also functioning to progressively advance the butter through the casing as it is worked from the inlet end to and through the outlet at the opposite end of the casing. This means as shown in Figures 1, 2 and 3 comprises a series of plates 17, shown as four in number disposed about the interior of the casing and each plate arranged to form a part of a helix and supported with an edge adjacent the inner surface of the casing and revoluble about the axis of the casing. The plates 17 are fixed at a side marginal portion and extend sidewise from the ends of arms 18 of spiders equidistantly spaced about and extending radially from a hub 19 whereby they are mounted on and spaced longitudinally of a shaft 20 extending axially through and rotatably supported at the ends in bearings arranged on the end closures 8 of the casing, as at 21, with the end of the shaft projecting from the closure 8 at the end of the casing having the inlet therein. The plates are of a length substantially equal to the length of the casing and extend longitudinally of the casing with the outer edge of the plates disposed adjacent the inner surface of the cylindrical wall of the casing and are arranged to form a part of a helix extending around the casing for approximately 180 degrees or one-half of a convolution. The shaft 20 is operatively connected to and rotated at approximately twenty revolutions per minute from suitable power means, and shown as a motor M, connected to the shaft by a belt or chain 22 passing around a wheel fixed on the motor shaft and a wheel 23 fixed on the input shaft of a speed reducing mechanism, and a pinion 24 fixed on the output shaft of said mechanism meshing with a gear 25 fixed on the end of the plate carrying shaft 20 projecting from the closure 8 at the inlet end of the casing.

In operation the motor is started and the motor imparting rotative movement to the shaft 20 and revolving movement to the plates 17. Simultaneously the conveyer 15 is set in operation causing butterfat granules transported thereby to be delivered at a predetermined rate into the hopper 14 and from the hopper through inlet opening 13 into and causing the butterfat granules to fall to the bottom of the casing in the path of movement of the revolving plates. The end portion of the plates at the inlet end of the casing as they move relative to the casing wall below the axis of the casing will gather together the butterfat and as the plates move from below the axis of the casing upwardly relative to the side wall of the casing they lift or elevate the butter to position above the axis of the casing and thus effect a turning movement of the butter, and as the plates move to position above the axis of the casing the butter thereon will move slightly longitudinally of the plates, and as the plates move from 130 to 135 degrees of a revolution from below the axis of the casing the butter will move off from the plates and fall to the bottom of the casing forwardly of the portion of the casing from which the butter was picked up by the plates and in position to be successively picked up and elevated by a successive portion of the plates. The butter as it impacts against the bottom of the casing is subjected to a compression force, which in effect is a kneading action applied to the butter. The successive picking up of the butter from the bottom of the casing and elevating it above the axis of the casing and the butter falling off from the plates to the bottom of casing slightly forward of the portion of the casing from which it was picked up progressively advances the butter through the casing from the inlet end to and discharged through the outlet at the opposite end of the casing.

To wash the butter as it is worked and/or to work water into the butter water is entered into the casing in sprays. For this purpose a pipe 26 closed at the opposite ends is extended along the exterior of the casing above the axis thereof, said pipe extending from adjacent the hopper 14 and is of a length to extend slightly beyond midway the ends of the casing. The pipe 26 has a series of nozzles 27 spaced along and connected in communication with the pipe which nozzles open to the casing through openings in the wall of the casing. The pipe 26 has a pipe 28 connected thereto intermediate the ends, and said pipe 28 leading from a source of water preferably cooled to a temperature of approximately 48 degrees F. and having a valve 29 interposed therein to control and regulate the quantity of water discharged into the casing. To drain surplus water from the casing an outlet conduit 30 is connected to and leads from the inlet end of the casing below the axis thereof, the inlet to said conduit being provided with a screen 31 to prevent draining granules or particles of butter off with the water.

In the modified apparatus illustrated in Figures 4, 5 and 6 the structure and mounting of the casing 7, the rotatable mounting of the shaft 20 in the casing and the means to rotate the shaft are the same as in Figures 1, 2 and 3, and the casing has the inlet 13 to which the bottom of the hopper 14 opens for the feeding or delivering of butterfat at a constant rate into the casing and the outlet 16 for the discharge of the worked butter. The casing is also provided with the means for discharging sprays of water therein and the outlet for draining surplus water from the casing. However, instead of utilizing a series of four plates equidistantly spaced about and of a length substantially the same as and extending longitudinally of the casing, a plurality of series of plates are utilized, and shown as five in number 32, 33, 34, 35 and 36 disposed successively along the length of the casing from the inlet end to the outlet end. The plates of each series forms a part of a helix extending through an arc of substantially 72 degrees of a convolution around the casing. The end series of plates 32 and 36 consist of two plates fixed at one end to and carried at the ends of a pair of arms 37 extending diametrically opposite from a hub whereby they are fixed on the shaft 20 to rotate therewith. The intermediate series of plates 33, 34 and 35 are fixed at the opposite ends to and carried at the ends of one pair of two pairs of arms 38, 39 spaced approximately 45 degrees from each other, and each pair of the pairs of arms extending diametrically opposite from a hub whereby they are fixed on the shaft 20 to rotate therewith. The opposite ends of the plates 32 are fixed to and carried at the ends of the pair of arms 38 of the next adjacent pairs of arms. The intermediate series of arms 33, 34 and 35 are fixed at one end to and carried at the ends of the pair of arms 38 of the pairs of arms and fixed at the opposite ends to and carried at the ends of the pair of arms 39 of the successive two pairs of arms, and the ends of the plates 36 opposite the ends connected to the arms 37 are fixed to and carried by the arms 39 of the adjacent two pairs of arms. In the operation of the apparatus with the modified arrangement of the plates shown in Figures 4, 5 and 6 the butterfat fed or delivered at a constant rate into the casing is picked up and elevated by the plates 32 to a plan above the axis of the casing when the butter moves off from said plates and falls to the bottom of the casing and upon a successive revolution of the plates is picked up by a successive portion of a plate 32 and the butter moving and falling from said plate 32 will fall to position to be picked up by the successive series of plates 33 and the butter will be picked up in succession by the successive series of plates 34, 35 and 36 and is thereby progressively advanced through the casing from the inlet end to the outlet end and the butter falling from the last series of plates 36 being delivered to and through the outlet 16, the plates functioning in the manner of the plates in Figures 1, 2 and 3 in that they successively pick up butter from the bottom of the casing, elevate it to a plane above the axis of the casing when it falls off from the plates to the bottom of the casing the impact of the butter subjecting the butter to a compression force and compacting the butter, and thus in successive sequence turning and subjecting the butter to a compression force and effecting a kneading of the butter and working water into the butter and causing milk solids not fat entrained by the butterfat to be extruded from the mass of butter which is drained off from the casing with the surplus water with the result that the butter when it approaches the delivery end of the casing acquires a desired waxy consistency and the desired quantity of water has been worked into the butter. Should it be desired to make salted butter salt is delivered into the inlet opening of the casing with the butterfat in proportion to the butterfat delivered or fed into the casing.

Having described my invention, I claim:

1. In continuous butter working apparatus, a fixed substantially horizontal cylindrical casing closed at the opposite ends and having an inlet for the butter to be worked opening through the side wall to one end and above the axis of the casing and an outlet for the worked butter from the opposite end through an end wall and below the axis of the casing, a shaft extending through and rotatable on the axis of the casing, spiders including a hub and arms spaced about and extending radially from the hub fixed on and spaced along the shaft, plates secured to and extending sidewise from the free ends of the spider arms with a longitudinal edge adjacent the inner surface of the casing and revoluble by the rotation of the shaft, and each plate arranged to form a part of a helix and adapted by the revolving movement thereof to successively lift butter from below the axis of the casing to and cause it to fall from a plane above the axis of the casing and progressively advance the butter from the inlet end to and through the outlet at the opposite end of the casing, and a row of spray heads opening to the casing above the axis thereof and intermediate the ends to discharge sprays of water into the casing for working into the butter, and the casing having a second outlet in the end wall of the casing opposite the end wall arranged with the first outlet and below the axis of the casing for draining surplus water from the casing.

2. In continuous butter working apparatus, a fixed substantially horizontal cylindrical casing closed at the opposite ends and having an inlet for the butter to be worked opening to one end of the casing above the axis thereof and an outlet for the worked butter opening through the opposite end and below the axis of the casing, means for continuously feeding butter to be worked through the inlet into the casing, a shaft extending through and rotatable on the axis of the casing, spiders fixed on and spaced equidistantly along the shaft from the inlet end to the outlet end of the casing, each spider including a hub engaged on the shaft, the spiders at the opposite ends of the casing having a pair of arms extending diametrically from the hub, and the intermediate spiders each having two pairs of diametrically oppositely extending arms, plates secured at a longitudinal edge portion to and extending between arms of successive spiders with the opposite edge of the plates adjacent the inner surface of the casing, a pair of said plates extending between the pair of arms of the spiders at the ends of the casing and a pair of the arms of the adjacent spiders, and plates extending between a pair of arms of the successive spiders intermediate the end spiders, and said plates by the rotation of the shaft adapted to pick up butter from below the axis and elevate it to and discharge it from the plates in a plane above the axis of the casing and progressively advance the butter in the casing from the inlet end to and discharge it through the outlet at the opposite end of the casing.

3. Continuous butter working apparatus as claimed in claim 2, wherein the plates are in the form of part of a helix and extend through an arc of approximately 60 degrees of a convolution.

CHARLES E. NORTH.

REFERENCES CITED

The following references are of record in the file of this patent:

UNITED STATES PATENTS

| Number | Name | Date |
|---|---|---|
| 158,097 | Lindbeck et al. | Dec. 22, 1874 |
| 891,468 | Dougan | June 23, 1908 |
| 1,500,061 | Dimm | July 1, 1924 |
| 2,032,201 | Davis et al. | Feb. 25, 1936 |
| 2,279,356 | Hougland et al. | June 26, 1945 |
| 2,395,051 | Horneman et al. | Feb. 19, 1946 |
| 2,463,915 | Shadwick | Mar. 8, 1949 |